(12) United States Patent
Deng

(10) Patent No.: US 12,717,062 B2
(45) Date of Patent: Aug. 25, 2026

(54) TELESCOPIC TUBE ASSEMBLY WITH LIMITED ROTATION FOR METAL DETECTOR

(71) Applicant: Maoquan Deng, Shenzhen (CN)

(72) Inventor: Maoquan Deng, Shenzhen (CN)

( * ) Notice: Subject to any disclaimer, the term of this patent is extended or adjusted under 35 U.S.C. 154(b) by 282 days.

(21) Appl. No.: 18/434,718

(22) Filed: Feb. 6, 2024

(65) Prior Publication Data

US 2024/0288606 A1 Aug. 29, 2024

Related U.S. Application Data

(60) Provisional application No. 63/448,373, filed on Feb. 27, 2023.

(51) Int. Cl.
*G01V 9/00* (2006.01)

(52) U.S. Cl.
CPC .................................... *G01V 9/00* (2013.01)

(58) Field of Classification Search
None
See application file for complete search history.

(56) References Cited

U.S. PATENT DOCUMENTS 4,576,501 A * 3/1986 McConnell ........... F16B 7/1472 403/104
5,285,702 A * 2/1994 Hillinger ................ B25G 1/043 403/109.8
2004/0189028 A1* 9/2004 Newman ................. H01K 3/32 294/210
2013/0236237 A1* 9/2013 Schmidt ................. F16B 7/042 403/109.3
2015/0020653 A1* 1/2015 Chen ....................... B25G 1/04 81/489

* cited by examiner

*Primary Examiner* — Eric S. McCall
*Assistant Examiner* — Nigel H Plumb

(57) ABSTRACT

The application disclosed a telescopic tube assembly with limited rotation and a metal detector. The telescopic assembly includes an outer tube and an inner tube slidably connected inside the outer tube. One end of the inner tube is fixedly sleeved with a positioning ring having a sliding groove. The outer tube wall has a positioning strip extending axially, with one end extending to the outer tube end, the other end forms a rotation space with axial distance no less than positioning ring. When sliding groove matches positioning strip, the inner tube moves axially inside outer tube. When positioning ring is in the rotation space, the inner tube rotates inside the outer tube. This allows axial movement only during use to maintain angle of parts, while allowing free rotation for storage.

16 Claims, 5 Drawing Sheets

TELESCOPIC TUBE ASSEMBLY WITH LIMITED ROTATION FOR METAL DETECTOR

CROSS REFERENCE TO RELATED APPLICATIONS

This application claims priority to U.S. Provisional Application No. 63/448,373, entitled "TELESCOPIC ROD ALLOWING AXIAL ROTATION AT LIMITED LOCATION" filed on Feb. 27, 2023, which is hereby incorporated by reference herein as if set forth in its entirety.

TECHNICAL FIELD

The application relates to the field of metal detection technology, specifically a telescopic tube assembly with limited rotation for metal detector.

BACKGROUND OF THE APPLICATION

In modern society, more and more people are starting to escape the city and participate in more outdoor activities. Many people choose to buy metal detectors and use them for treasure hunting activities to relax and fully experience life. Metal detectors used for treasure hunting are mainly used to detect metal objects buried underground, such as ancient coins, valuable gold and silver jewelry, rare metal souvenirs, gold nuggets, etc.

The main structure of existing treasure hunting detectors includes a handle, a control box, a detection coil, elbow rests, and a telescopic rod assembly to connect them. For products used for outdoor activities, the most important thing is that the weight and size need to be controlled to be very low, so that it is convenient to carry the outdoor products to farther places and not easily cause fatigue to the user. The commonly used detection coil size is around 11 inches. When the telescopic rod retracts, the maximum plane occupied by the detection coil prevents the conventional detector from being stored in the smallest size. In order to reduce waste in packaging and transportation, existing metal detectors usually need to remove the detection coil to achieve a smaller size for storage.

In addition, the angle between the handle, elbow rests, and detection coil of existing metal detectors needs to correspond to the height and preferences of the user during use. Once adjusted, the user does not want the angle between the handle, elbow rests and detection coil on the telescopic rod to change. The overall length of the metal detector is mainly determined by the shortest length of the telescopic rod. The height dimension is determined by the detection coil. The rotating detection coil on the market can achieve storage but cannot guarantee that the angle between the handle, elbow rests and detection coil on the telescopic rod remains unchanged.

DESCRIPTION OF THE APPLICATION

To solve the problems in the background art, the application provides a telescopic tube assembly with limited rotation for metal detector, which allows the metal detector to maintain the angle between the parts during use by setting a rotation space on the outer tube. During storage, the telescopic rube can freely rotate to achieve the smallest storage space.

The first objective of the application is to provide a telescopic tube assembly with limited rotation, comprising an outer tube and an inner tube slidably connected inside the outer tube;

one end of the inner tube is fixed with a positioning ring, and a sliding groove extending axially is disposed on the outer side of the positioning ring, and the sliding groove extends from one end of the positioning ring to the other end;

the outer tube comprises an outer tube proximal end, an outer tube distal end, and an outer tube wall extending axially between the outer tube proximal end and the outer tube distal end;

a positioning strip extending axially is disposed on the inner wall surface of the outer tube wall; one end of the positioning strip extends to the outer tube distal end, and the other end of the positioning strip forms a rotation space with the outer tube proximal end, the axial distance of the rotation space is not less than the axial length of the positioning ring;

when the sliding groove matches the positioning strip, the inner tube can move axially inside the outer tube. When the positioning ring is located in the rotation space, the inner tube can rotate inside the outer tube.

In one embodiment, the positioning ring is fixedly sleeved at one end of the inner tube by injection molding.

In another embodiment, the positioning ring comprises two symmetrically arranged annular positioning pieces, and the gap between the two annular positioning pieces forms two sliding grooves, there are also two positioning strips on the outer tube wall corresponding one-to-one with the two sliding grooves.

In another embodiment, the positioning ring is detachably connected to the inner tube. positioning protrusions are disposed on the inner wall surface of the positioning ring, and positioning holes are opened at corresponding positions of the inner tube to match the positioning protrusions.

In another embodiment, a fastening screw is fixedly sleeved around the outer periphery of the outer tube distal end and partially protrudes out of the outer tube distal end, a tightening ring is disposed between the fastening screw and the inner tube, a fastening sleeve ring is screwed outside the fastening screw to tighten or loosen the tightening ring so as to fix or release the inner tube and outer tube.

In another preferred embodiment, the assembly further comprises a sleeve tube sleeved outside the outer tube, a positioning sleeve ring matching the outer tube is fixedly sleeved at the outer tube proximal end. positioning sliding strips extending axially are disposed on the inner wall surface of the sleeve tube. the structure of the positioning sleeve ring is the same as that of the positioning ring, the sliding grooves of the positioning sleeve ring are slidably connected to the positioning sliding strips.

In another embodiment, there are at least two sleeve tubes sleeved outside the outer tube in sequence. Positioning sleeve rings are fixedly disposed at one end of all the sleeve tubes between the outer tube and the outermost sleeve tube. The sliding grooves of the positioning sleeve rings are slidably connected to the corresponding positioning sliding strips.

In another embodiment, fastening screws are fixedly sleeved at one end of the sleeve tubes away from the positioning sleeve rings and partially protrude out of the sleeve tubes. Tightening rings are disposed between the fastening screws and the adjacent outer tube or sleeve tube inside. Fastening sleeve rings are screwed outside the fastening screws to fix or release the sleeve tubes and outer tube or the sleeve tubes.

The second objective of application is to provide a metal detector comprising any of the aforesaid telescopic tube assemblies and further comprising a detection coil rotatably connected to the end of the inner tube away from the positioning ring.

the beneficial effects of the application are:

1. The telescopic tube assembly allows axial movement only during use to keep the angle between parts unchanged. During storage, free rotation can be achieved for minimized size.
2. More sleeve tubes can further reduce the minimum retractable size for easier portability.
3. When applied to a metal detector, the assembly allows optimized storage size while keeping handle, elbow rest and detection coil angle unchanged during use.

BRIEF DESCRIPTION OF THE DRAWINGS

To further clarify the implementation of this utility model or the technical solutions in existing technology, a brief introduction to the drawings needed for describing the embodiments or existing technology follows. Obviously, the drawings described below represent only some embodiments of this utility model. For those skilled in the art, other drawings can be obtained without creative effort based on these drawings.

LIST OF REFERENCES AND FIGURES

100—telescopic tube assembly; 1—inner tube; 11—positioning hole; 2—outer tube; 21—outer tube proximal end; 22—outer tube distal end; 23—outer tube wall; 24—positioning strip; 25—rotation space; 3—positioning ring; 31—annular positioning piece; 32—positioning protrusion; 33—sliding groove; 4—fastening screw; 5—tightening ring; 6—fastening sleeve ring; 7—sleeve tube; 71—positioning sliding strip; 8—positioning sleeve ring; 200—detection coil.

PREFERRED EMBODIMENT OF THE APPLICATION

The technical solutions in the embodiments of the application will be clearly and completely described below with reference to the accompanying drawings. Apparently, the described embodiments are only some embodiments of the application, not all embodiments. All other embodiments obtained by a person of ordinary skill in the art based on the embodiments of the application without creative efforts shall fall within the protection scope of the application.

The application will be further described in detail below with reference to FIGS. 1-9 and specific embodiments.

As shown in FIGS. 1-9, the application provides a telescopic tube assembly 100 with limited rotation, which can be applied to home products or outdoor products that need telescoping. During use of the product, the telescopic tube assembly 100 cannot freely rotate circumferentially to keep the angles of the parts unchanged. During storage of the product, the telescopic tube assembly can freely rotate to achieve the smallest storage space. The telescopic tube assembly 100 can be applied to various types of metal detectors, but is not limited thereto.

Figure 1:
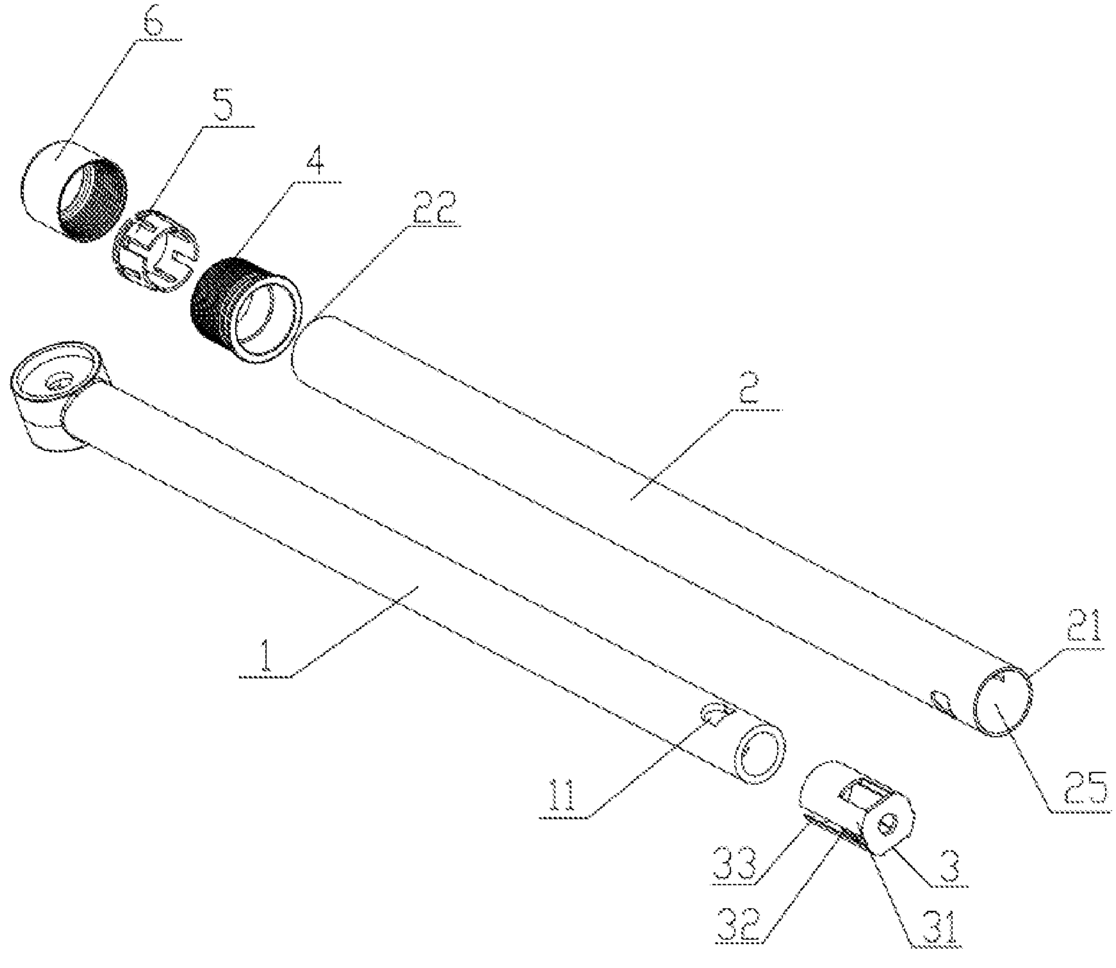
FIG. 1 is an exploded view of the telescopic tube assembly of the application.
Figure 2:
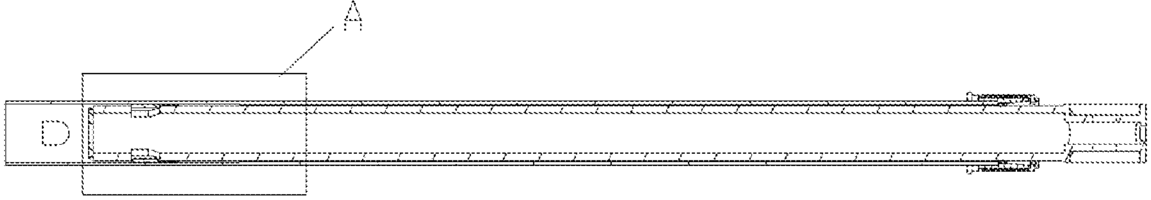
FIG. 2 is a sectional view of the telescopic tube assembly of the application.
Figure 3:
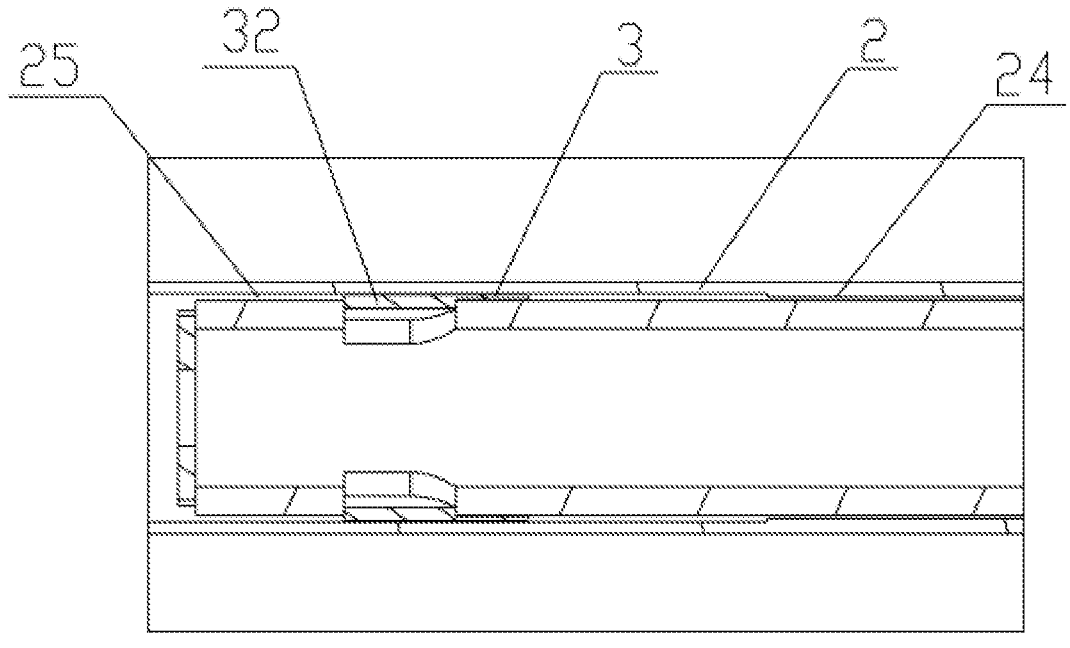
FIG. 3 is an enlarged view of part A of FIG. 2.
Figure 4:
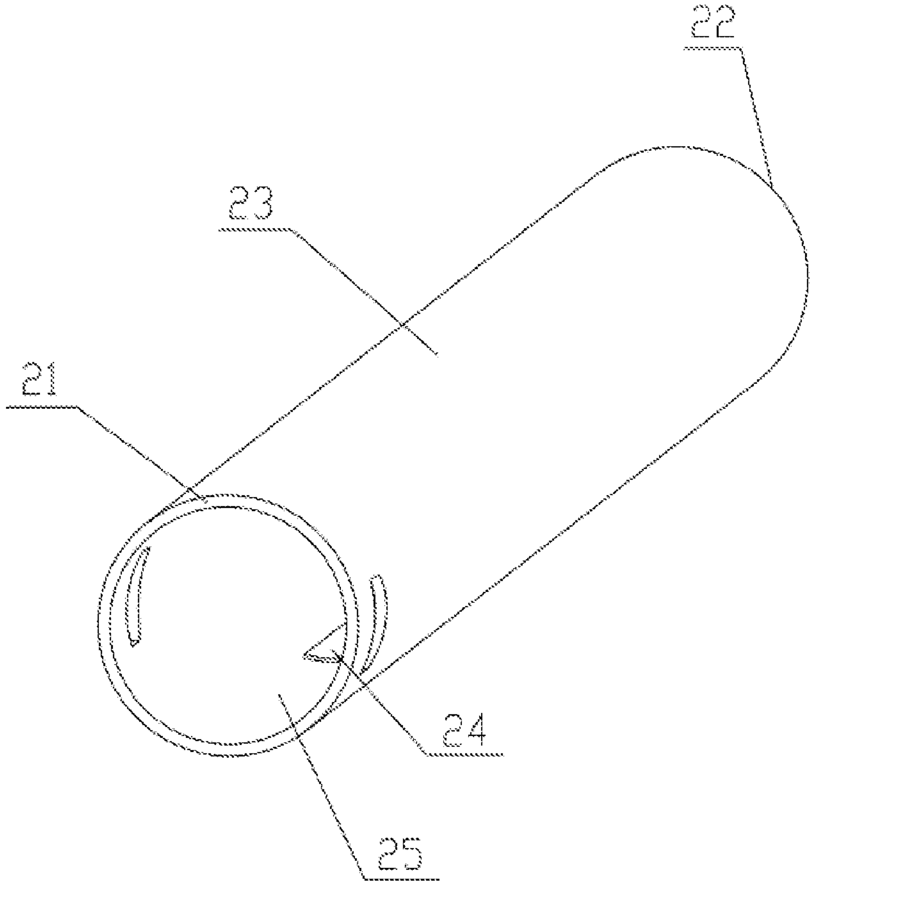
FIG. 4 is a view showing the structure of the outer tube of the telescopic tube assembly of the application.

Referring to FIGS. 1-3, the telescopic tube assembly 100 comprises an outer tube 2 and an inner tube 1, the inner tube 1 slidably connected inside the outer tube 2. The relative axial movement of the inner tube 1 and the outer tube 2 can adjust the length of the telescopic tube assembly 100. One end of the inner tube 1 is fixedly sleeved with a positioning ring 3. A sliding groove 33 extending axially is disposed on the outer side of the positioning ring 3, and the sliding groove 33 extends from one end of the positioning ring 3 to the other end. Since the positioning ring 3 is sleeved on the outer wall of the inner tube 1, there is a certain gap between the inner tube 1 and the outer tube 2, and the inner tube 1 contacts the outer tube 2 through the positioning ring 3. The outer tube 2 comprises an outer tube proximal end 21, an outer tube distal end 22, and an outer tube wall 23 extending axially between the outer tube proximal end 21 and the outer tube distal end 22. The outer tube proximal end 21 corresponds to the end of the inner tube 1 having the positioning ring 3, and the outer tube distal end 22 corresponds to the other end of the inner tube 1 without the positioning ring 3. A positioning strip 24 extending axially is disposed on the inner wall surface of the outer tube wall 23. One end of the positioning strip 24 extends to the outer tube distal end 22, and the other end of the positioning strip 24 forms a rotation space 25 with the outer tube proximal end 21. The axial distance of the rotation space 25 is not less than the axial length of the positioning ring 3, that is, the other end of the positioning strip 24 does not extend to the outer tube proximal end 21, and the positioning ring 3 can rotate in the rotation space 25.

When the product is in the stored state, the positioning ring 3 of the inner tube 1 is located in the rotation space 25, and the inner tube 1 or the outer tube 2 can be freely rotated according to storage needs to place the parts on the inner tube 1 and outer tube 2 at a suitable angle to achieve storage with the smallest size. When the product needs to be used, pulling the inner tube 1 or the outer tube 2 causes the sliding groove 33 of the positioning ring 3 to be engaged with the positioning strip 24 of the outer tube 2. Under the guiding action of the positioning strip 24, the inner tube 1 moves axially along the outer tube 2. Since the positioning strip 24 protrudes on the inner wall 23 of the outer tube, the inner tube 1 and the outer tube 2 can only move axially and cannot rotate, which ensures that the angles of the parts on the inner tube 1 and outer tube 2 remain unchanged during use to avoid the inconvenience caused by repeated adjustments.

As an example, the application of the telescopic tube assembly 100 to a metal detector is described. It can be known that the overall length of the metal detector is mainly determined by the shortest length of the telescopic tube assembly 100, and the height dimension is determined by the detection coil 200. Compact size during storage is an important factor affecting market share for metal detector products mainly used in outdoor activities. Applying the telescopic tube assembly 100 of the present application to metal detectors allows the metal detector to be rotated to place the handle, elbow rests and detection coil at suitable positions to align the longest dimension of the detection coil 200 with the telescopic tube assembly 100 during storage. The shortest dimension of the detection coil 200 becomes the height of the entire product to minimize the storage size for easy portability. When using the detector, pulling the inner tube 1 or the outer tube 2 causes the sliding groove 33 on the positioning ring 3 to be engaged with the positioning strip 24 of the outer tube 3, so that the inner tube 1 and the outer tube 2 can only move axially and cannot rotate, thereby keeping the handle, elbow rests and detection rod at a constant angle on the telescopic tube assembly 100. After adjusting the length of the telescopic tube assembly 100, the user can always ensure that the angle between the handle, elbow rests and detection coil remains unchanged during use.

In one specific embodiment, the positioning ring 3 is fixedly sleeved at one end of the inner tube 1 by injection molding, so that the positioning ring 3 directly becomes a part of the inner tube 1, which can achieve the same effect without reiterating here.

Figure 5:
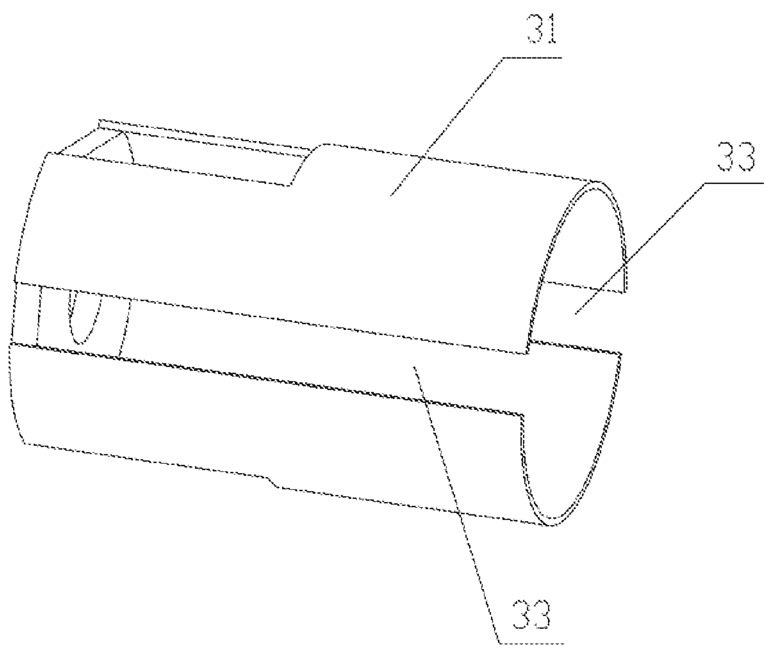
FIG. 5 is a view showing the structure of the positioning ring of the telescopic tube assembly of the application.

Specifically, referring to FIG. 5, the positioning ring 3 comprises two symmetrically arranged annular positioning pieces 31, and the gap between the two annular positioning pieces 31 forms two sliding grooves 33. There are also two positioning strips 24 on the outer tube wall 23 corresponding one-to-one to the two sliding grooves 33. The two positioning strips 24 provide guidance for the movement of the inner tube 1 so that the inner tube 1 moves axially relative to the outer tube 2 more stably. It should be noted that when the positioning ring 3 is fixed to the inner tube 1 by injection molding, the positioning ring 3 may only include two annular positioning pieces 31. When the positioning ring 3 is fixed to the inner tube 1 in other ways, the positioning ring 3 may also include end connecting pieces connecting the two annular positioning pieces 31. The present application does not specifically limit the structure of the positioning ring 3, and both structures fall within the scope of protection of the present application.

In one embodiment, the positioning ring 3 is detachably connected to the inner tube 1. Positioning protrusions 32 are disposed on the inner wall surface of the positioning ring 3, and positioning holes 11 are opened at corresponding positions of the inner tube 1 to match the positioning protrusions 32. Or positioning holes are opened on the inner wall surface of the positioning ring 3, and positioning protrusions are disposed at corresponding positions of the inner tube 1 to match the positioning holes. The shapes of the positioning protrusion 32 and the positioning hole 11 match each other. To install the positioning ring 3, the positioning protrusion 32 on the positioning ring 3 can be snapped into the positioning hole 11 on the inner tube 1 to complete the fixing connection between them, which is convenient to install and allows the universal use of the inner tube 1 and outer tube 2.

Specifically, referring to FIG. 1, a fastening screw 4 is fixedly sleeved around the outer periphery of the outer tube distal end 22 and partially protrudes out of the outer tube distal end 22. A tightening ring 5 is disposed between the fastening screw 4 and the inner tube 1. A fastening sleeve ring 6 is screwed outside the fastening screw 4 to tighten or loosen the tightening ring 5 so as to fix or release the inner tube 1 and outer tube 2. That is, when the telescopic tube assembly 100 is adjusted to the required length, the relative position between the inner tube 1 and the outer tube 2 can be fixed by tightening the fastening sleeve ring 6. When storage or change of required length is needed, the fastening sleeve ring 6 is loosened so that the inner tube 1 and the outer tube 2 can move relative to each other.

Figure 6:
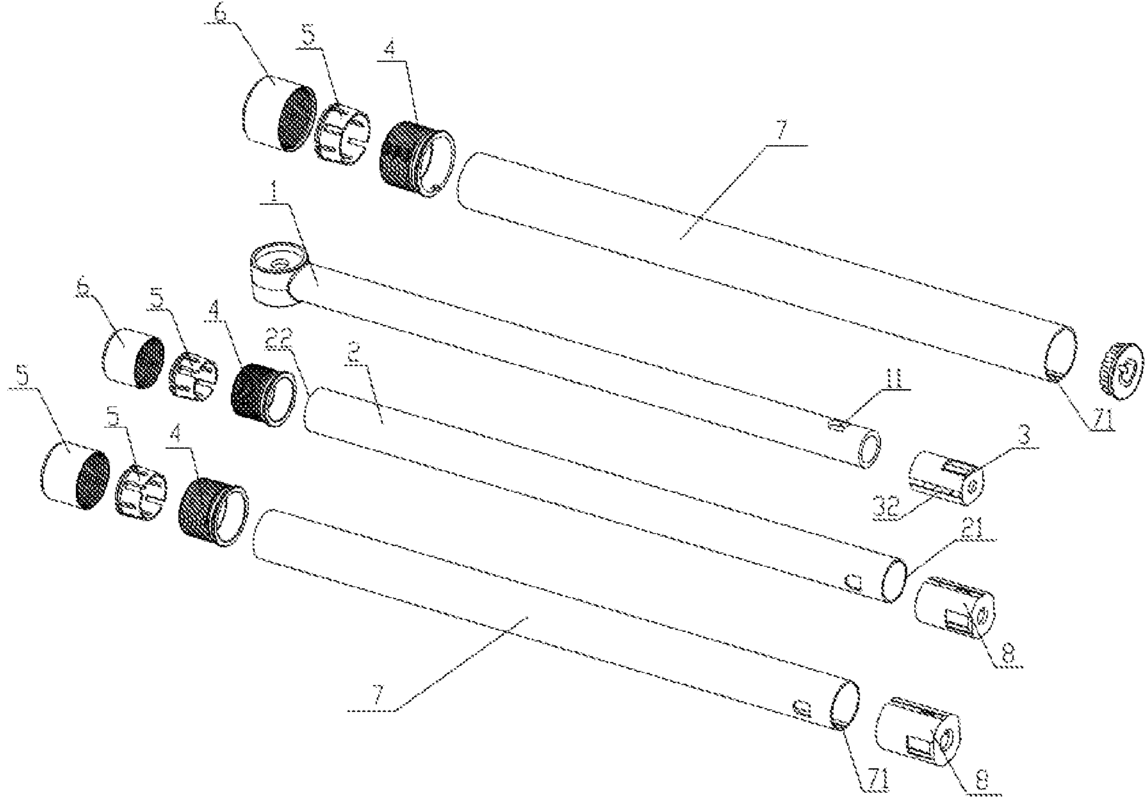
FIG. 6 is an exploded view showing an embodiment in which the outer tube is provided with a sleeve tube.
Figure 7:
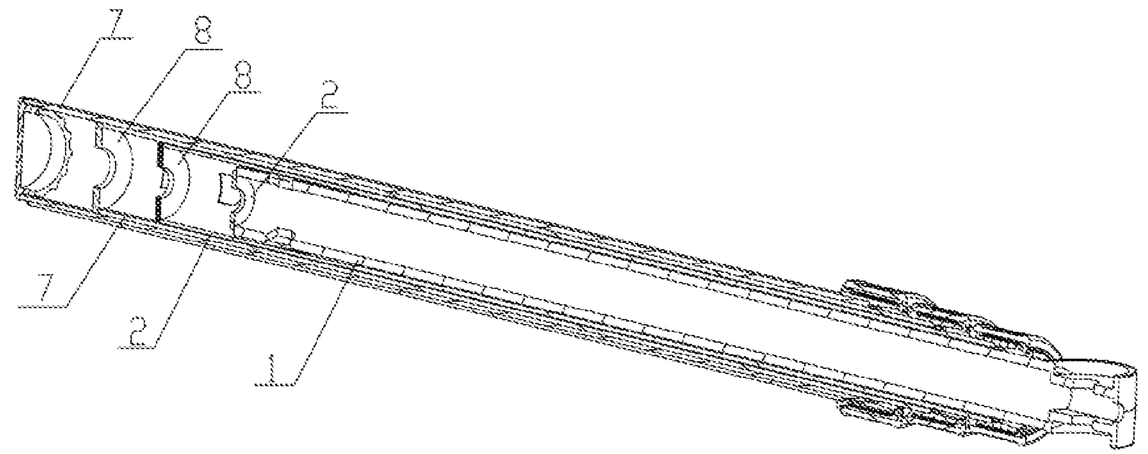
FIG. 7 is a longitudinal sectional view showing an embodiment in which the outer tube is provided with a sleeve tube.
Figure 8:
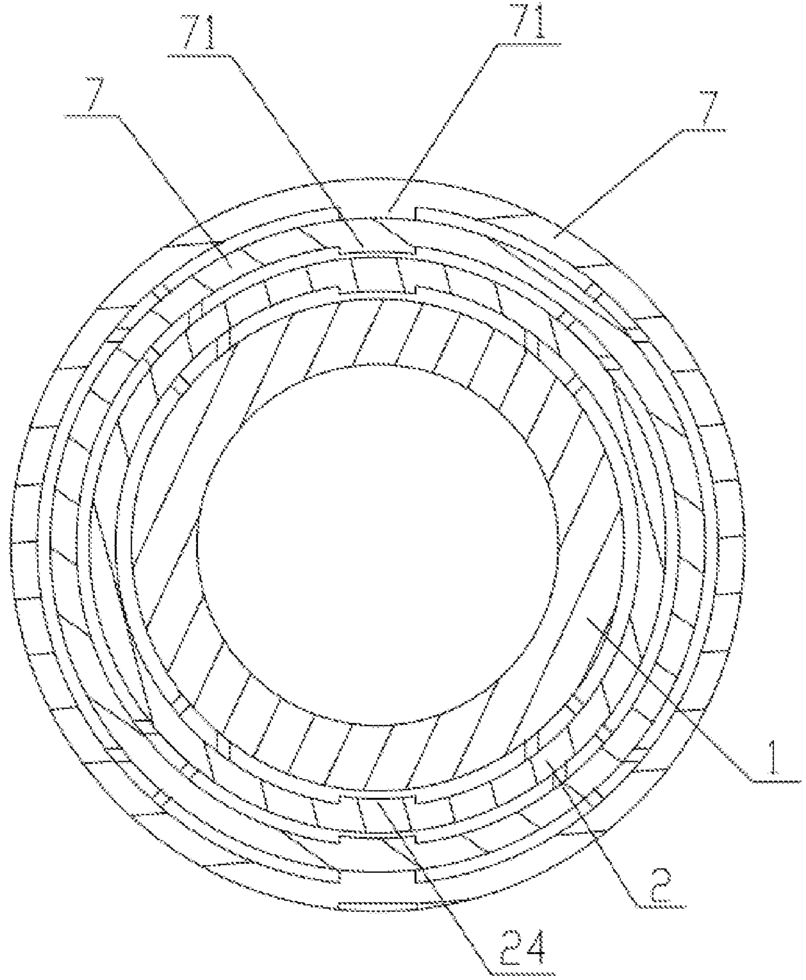
FIG. 8 is a cross-sectional view showing an embodiment in which the outer tube is provided with a sleeve tube.
Figure 9:
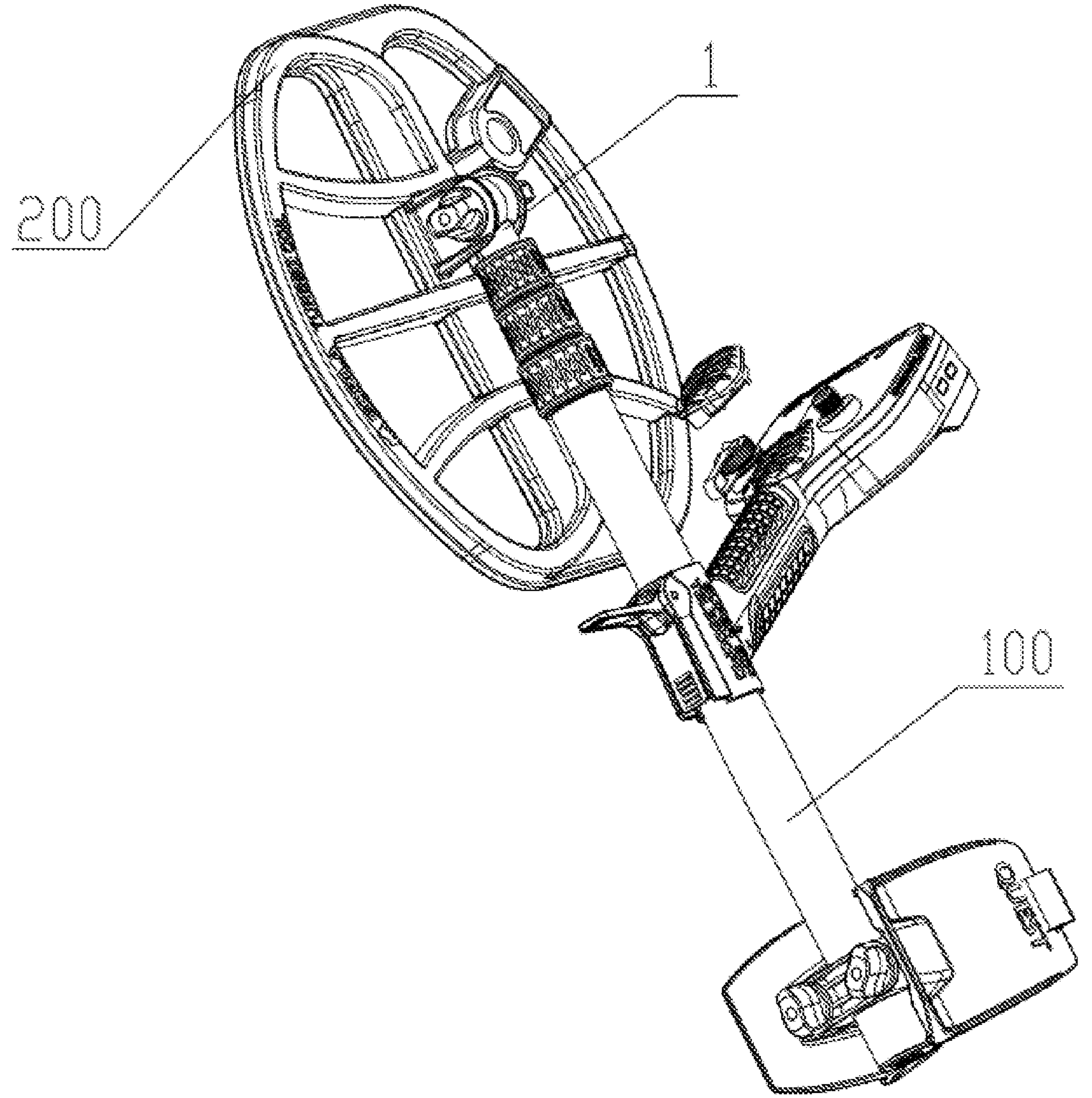
FIG. 9 is an overall structural diagram of the metal detector of the application.

In a preferred embodiment, referring to FIGS. 6-8, the telescopic tube assembly 100 further comprises a sleeve tube 7 sleeved on the outer tube 2, and the outer tube 2 and the sleeve tube 7 can slide axially relative to each other. Under the same requirements, the length of the inner tube 1 and outer tube 2 can be further reduced to reduce the stored size. Specifically, a positioning sleeve ring 8 matching the outer tube 2 is fixedly sleeved at the outer tube proximal end 21. Positioning sliding strips 71 extending axially are disposed on the inner wall surface of the sleeve tube 7 from one end to the other end, that is, the axial length of the positioning sliding strips 71 is the same as the axial length of the sleeve tube 7. The structure of the positioning sleeve ring 8 is the same as that of the positioning ring 3 but with different sizes. The sliding grooves of the positioning sleeve ring 8 are slidably connected to the positioning sliding strips 71, so that the sleeve tube 7 and the outer tube 2 can only move axially relative to each other and cannot rotate relative to each other.

More preferably, there are at least two sleeve tubes 7 sleeved on the outer tube 2 in sequence. The more sleeve tubes 7 there are, the smaller the minimum retractable length of the telescopic tube assembly 100 will be. Specifically, the number of sleeve tubes 7 can be selected according to the principle of facilitating storage and portability. The sleeve tubes can only move axially relative to each other and cannot rotate relative to each other. FIGS. 6 and 7 show two sleeve tubes 7 sleeved on the outer tube 2 as an example. Positioning sliding strips 71 extending axially are disposed on the inner wall surface of each sleeve tube 7, and positioning sleeve rings 8 are fixedly disposed at one end of all the sleeve tubes between the outer tube 2 and the outermost sleeve tube 7. The sliding grooves of the positioning sleeve rings 8 are slidably connected to the corresponding positioning sliding strips 71 to achieve axial movement of each sleeve tube 7.

Specifically, fastening screws 4 are fixedly sleeved at one end of the sleeve tubes 7 away from the positioning sleeve rings 8 and partially protrude out of the sleeve tubes 7. Tightening rings 5 are disposed between the fastening screws 4 and the adjacent outer tube 2 or sleeve tube 7. Fastening sleeve rings 6 are screwed outside the fastening screws 4 to fix or release the sleeve tubes 7, outer tube 2, or sleeve tubes 7. The fastening sleeve rings 6 are used to fix the relative positions between the sleeve tubes to ensure that the relative distance between the parts on the product remains unchanged during use.

Preferably, the inner tube 1, outer tube 2 and sleeve tube 7 are all circular tubes. Of course, other shapes of inner tube 1, outer tube 2 and sleeve tube 7 can also be selected and fall within the scope of protection of the present application.

The application also provides a metal detector, comprising any of the aforesaid telescopic tube assemblies and further comprising a detection coil 200. The detection coil 200 is rotatably connected to the end of the inner tube 1 away from the positioning ring 3. The metal detector of the present application adopts all the technical solutions of the embodiments of the aforesaid telescopic tube assembly, and thus has at least all the beneficial effects brought by the technical solutions of the embodiments of the telescopic tube assembly, which will not be repeated here.

In the above, the application has been further described in detail with reference to specific embodiments. However, it should be understood that the specific descriptions here should not be construed as limitations on the essence and scope of the application. Various modifications made by those skilled in the art to the above embodiments without creative efforts after reading this specification shall fall within the scope of protection of the application.

The invention claimed is:

1. A telescopic tube assembly with limited rotation, comprising an outer tube and an inner tube slidably connected inside the outer tube;

one end of the inner tube is fixedly sleeved with a positioning ring, the outer side of the positioning ring is provided with a sliding groove extending axially, and the sliding groove extends from one end of the positioning ring to the other end;

the outer tube comprises an outer tube proximal end, an outer tube distal end, and an outer tube wall extending axially between the outer tube proximal end and the outer tube distal end, inner wall surface of the outer tube wall is provided with a positioning strip extending axially, one end of the positioning strip extends to the outer tube distal end, the other end of the positioning strip forms a rotation space with the outer tube proximal end, the axial distance of the rotation space is not less than the axial length of the positioning ring;

when the sliding groove matches the positioning strip, the inner tube can move axially inside the outer tube; when the positioning ring is located in the rotation space, the inner tube can rotate inside the outer tube.

2. The telescopic tube assembly according to claim 1, wherein the positioning ring is fixedly sleeved at one end of the inner tube by injection molding.

3. The telescopic tube assembly according to claim 1, wherein the positioning ring comprises two symmetrically arranged annular positioning pieces, the gap between the two annular positioning pieces forms two sliding grooves, there are also two positioning strips on the outer tube wall corresponding one-to-one with the two sliding grooves.

4. The telescopic tube assembly according to claim 1, wherein the positioning ring is detachably connected to the inner tube; positioning protrusions are disposed on the inner wall surface of the positioning ring, and positioning holes are disposed at corresponding positions of the inner tube, or positioning holes are disposed on the inner wall surface of the positioning ring, and positioning protrusions are disposed at corresponding positions of the inner tube; the shapes of the positioning protrusions match the positioning holes.

5. The telescopic tube assembly according to claim 1, wherein a fastening screw is fixedly sleeved around the outer periphery of the outer tube distal end and partially protrudes out of the outer tube distal end, a tightening ring is disposed between the fastening screw and the inner tube, a fastening sleeve ring is screwed outside the fastening screw to tighten or loosen the tightening ring so as to fix or release the inner tube and outer tube.

6. The telescopic tube assembly according to claim 1, wherein comprising a sleeve tube sleeved outside the outer tube, the outer tube proximal end is fixedly sleeved with a positioning sleeve ring matching the outer tube, positioning sliding strips extending axially are disposed on the inner wall surface of the sleeve tube, the structure of the positioning sleeve ring is the same as that of the positioning ring, the sliding grooves of the positioning sleeve ring are slidably connected to the positioning sliding strips.

7. The telescopic tube assembly according to claim 6, wherein there are at least two sleeve tubes sleeved outside the outer tube in sequence, positioning sliding strips extending axially are disposed on the inner wall surface of each sleeve tube, positioning sleeve rings are fixedly disposed at one end portion of all the sleeve tubes between the outer tube and the outermost sleeve tube, the sliding grooves of the positioning sleeve rings are slidably connected to corresponding positioning sliding strips.

8. The telescopic tube assembly according to claim 7, wherein fastening screws are fixedly sleeved at one end of the sleeve tubes away from the positioning sleeve rings and partially protrude out of the sleeve tubes, tightening rings are disposed between the fastening screws and adjacent outer tube or sleeve tube inside, fastening sleeve rings are screwed outside the fastening screws to fix or release the sleeve tubes and outer tube or sleeve tubes.

9. A metal detector, comprising the telescopic tube assembly according to claim 1, wherein further comprising a detection coil rotatably connected to the end of the inner tube away from the positioning ring.

10. The metal detector according to claim 9, wherein the positioning ring is fixedly sleeved at one end of the inner tube by injection molding.

11. The metal detector according to claim 9, wherein the positioning ring comprises two symmetrically arranged annular positioning pieces, the gap between the two annular positioning pieces forms two sliding grooves, there are also two positioning strips on the outer tube wall corresponding one-to-one with the two sliding grooves.

12. The metal detector according to claim 9, wherein the positioning ring is detachably connected to the inner tube; positioning protrusions are disposed on the inner wall surface of the positioning ring, and positioning holes are disposed at corresponding positions of the inner tube, or positioning holes are disposed on the inner wall surface of the positioning ring, and positioning protrusions are disposed at corresponding positions of the inner tube; the shapes of the positioning protrusions match the positioning holes.

13. The metal detector according to claim 9, wherein a fastening screw is fixedly sleeved around the outer periphery of the outer tube distal end and partially protrudes out of the outer tube distal end, a tightening ring is disposed between the fastening screw and the inner tube, a fastening sleeve ring is screwed outside the fastening screw to tighten or loosen the tightening ring so as to fix or release the inner tube and outer tube.

14. The metal detector according to claim 9, wherein comprising a sleeve tube sleeved outside the outer tube, the outer tube proximal end is fixedly sleeved with a positioning sleeve ring matching the outer tube, positioning sliding strips extending axially are disposed on the inner wall surface of the sleeve tube, the structure of the positioning sleeve ring is the same as that of the positioning ring, the sliding grooves of the positioning sleeve ring are slidably connected to the positioning sliding strips.

15. The metal detector according to claim 14, wherein there are at least two sleeve tubes sleeved outside the outer tube in sequence, positioning sliding strips extending axially are disposed on the inner wall surface of each sleeve tube, positioning sleeve rings are fixedly disposed at one end portion of all the sleeve tubes between the outer tube and the outermost sleeve tube, the sliding grooves of the positioning sleeve rings are slidably connected to corresponding positioning sliding strips.

16. The metal detector according to claim 15, wherein fastening screws are fixedly sleeved at one end of the sleeve tubes away from the positioning sleeve rings and partially protrude out of the sleeve tubes, tightening rings are disposed between the fastening screws and adjacent outer tube or sleeve tube inside, fastening sleeve rings are screwed outside the fastening screws to fix or release the sleeve tubes and outer tube or sleeve tubes.

* * * * *